Oct. 6, 1931.  K. R. GARNER  1,826,279
AUTOMOBILE CHAIN
Filed May 26, 1928
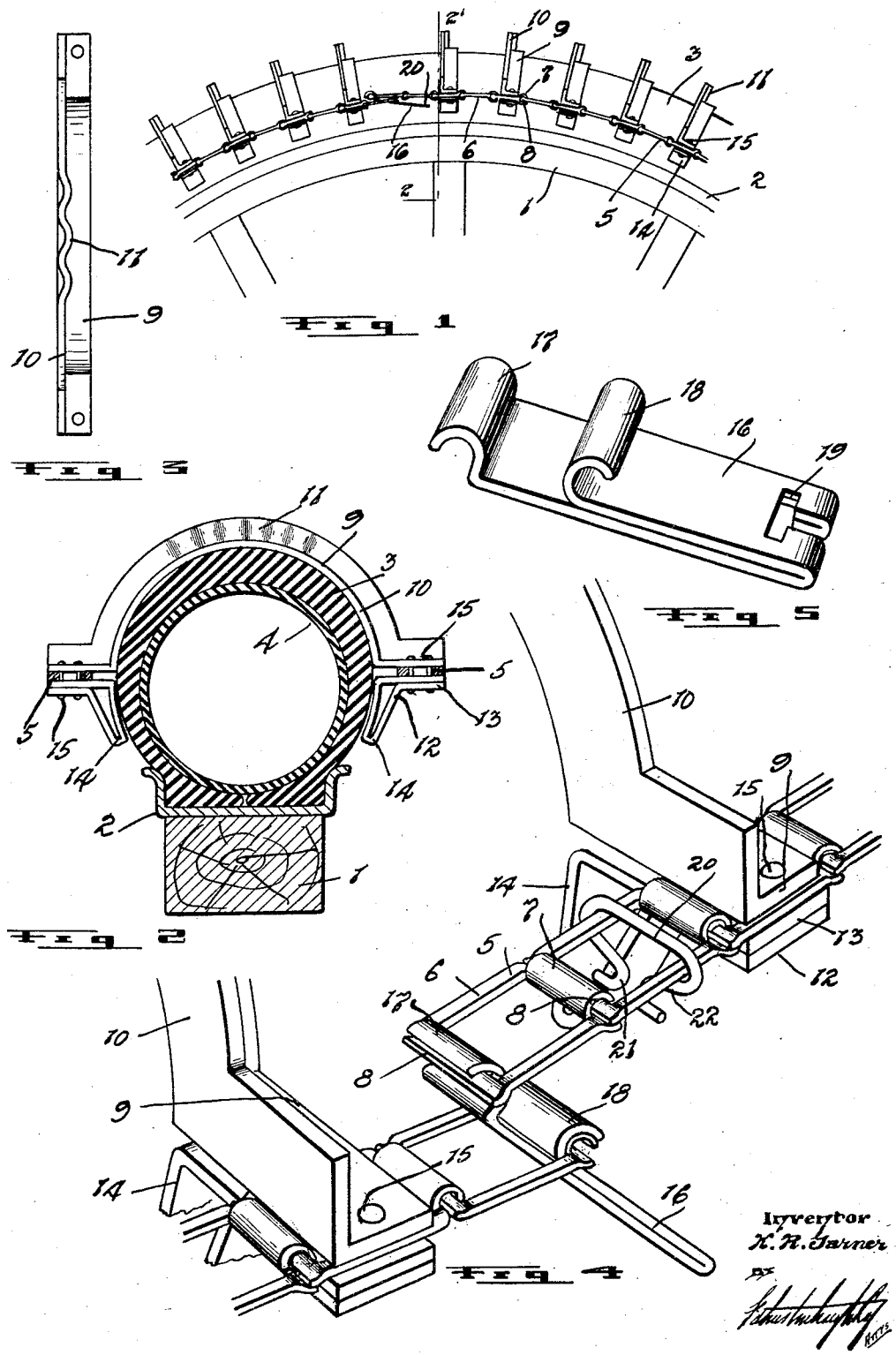

Patented Oct. 6, 1931

1,826,279

UNITED STATES PATENT OFFICE

KIRBY R. GARNER, OF PRUD'HOMME, SASKATCHEWAN, CANADA

AUTOMOBILE CHAIN

Application filed May 26, 1928. Serial No. 280,903.

The invention relates to improvements in automobile chains and an object of the invention is to provide a simply constructed, easily assembled, inexpensive and durable chain which can be readily fastened on or removed from the tire as occasion demands.

A further object of the invention is to provide flanged cross bars curved to receive the tread side of the tire and having outstanding ends connected by side chains, the side chains being in the form of flat lying links, detachably connected together, such latter permitting of the ready shortening or lengthening of the chains and also giving increased bearing surface on the roadway.

A further object of the invention is to provide the flanges with corrugations to prevent lateral skidding or side slip and further to provide means for limiting the rotary end movement of the bars in respect to the tire.

A further object of the invention is to provide a simple, easily operated and effective means for detachably fastening the ends of the side chains together.

With the above more important objects in view, the invention consists essentially in the arrangement and construction of parts hereinafter more particularly described, reference being had to the accompanying drawings, in which:—

Fig. 1 is a side view of a portion of a wheel showing my chains thereon.

Fig. 2 is an enlarged detailed vertical sectional view at 2—2' Figure 1.

Fig. 3 is an enlarged detailed plan view of one of the flanged cross bars.

Fig. 4 is a perspective view showing the ends of one chain and the manner in which they are connected and locked together.

Fig. 5 is a perspective view of one of the locking levers employed.

In the drawings like characters of reference indicate corresponding parts in the several figures.

I have not herein considered it necessary to show an entire wheel nor the entire chain, it being sufficient for the purpose of this description to understand that my device entirely surrounds the outer casing of the wheel in the same manner as does the ordinary automobile chain.

The wheel felloe 1 carries the customary metallic rim 2 on which is mounted the outer casing or tire 3 which contains the inflated rubber tube 4.

In carrying out my invention, I provide a side chain 5 at each side of the tire, the chains being located approximately as shown in Figures 1 and 2. Each side chain is formed from a plurality of similar detachably connected flat links 6, each link lying in a position substantially at right angles to the side of the tire. The detailed structure of the links is not herein enlarged upon other than that one end of each link is in the form of a split sleeve 7 which receives the other end 8 of the adjacent link. Chains of this kind are now found on the market being used on farm implements such as McCormack, Deering and International Harvester Company binders and known as steel chain No. 55.

The chains are located so that the links of the one chain are directly opposite those of the other whereby the links appear in pairs, one on each side of the tire. Each alternate pair of links is connected by a cross bar 9 which has the body part thereof curved to receive the tread side of the tire and the ends thereof outstanding to overlie the bodies of the links. Each cross bar is provided with a radially disposed outstanding flange 10 crossing the tread side of the tire and provided at its central portion with corrugations 11, such acting to prevent side slipping or skidding.

To the inner sides of the links carrying the cross bars, I locate similar bars 12 which are centrally bent as best shown in Figure 2 to provide attaching ends 13 and inwardly curving stop fingers 14. The attaching ends 13 of the bars are riveted as indicated at 15 to the overlying ends of the cross bars, the rivets passing through the open centres of the links. In this way, the cross bars as well as the fingers are firmly fastened to the side chains. It will be observed that there is a set of fingers at each side of the casing and that the tips of the fingers are spaced from and oppose the flanged sides of the rim 2 with the result that any undue rotary movement of the cross bars in respect to the casing will be resisted by the tips of the fingers coming in contact with the side flange of the rim.

The chains will be shortened or lengthened by removing or undoing links and so can be accommodated to the tire.

The free ends of the chains are pulled tight and connected together by utilizing a special lever for each chain, one of the levers being shown in Figure 5. Here it will be observed that the said lever 16 is formed from a predetermined length of bar bent backwardly on itself to provide long and short ends. The long end of the bar terminates in a hook 17 facing in one direction and the short end of the bar terminates in a hook 18 facing in the opposite direction. At the point where the bar is bent, it is provided with a T-shaped slot 19.

One end of each chain carries a locking clip 20 which is made from spring wire bent in the manner best shown in Figure 4 where it will be observed that the clip is retained on the chain and has U-shaped ends 21 and 22. When it is desired to fasten the ends of the chain together, the lever in each instance is caught on the ends of the chain in the manner shown in Figure 4 and then the lower end thereof is rotated in a counter clockwise direction to pass the slotted end of the lever towards the locking clip or keeper. The U-shaped portions of the keeper are adapted to be sprung through the contracted or narrow portion of the slot 19 and having passed through this to spring apart and catch in the ends of the larger portion of the slot.

Whilst I have described a specific lever and keeper arrangement for drawing up and fastening the ends of the chains, it will be readily understood I do not desire to be limited to the precise arrangement shown as any other suitable device could be used. It will be observed that when finally fastened, the levers are to the inner sides of the chains so that they are not in any way contacting with the road surface.

A chain of this nature gives a relatively large wearing surface and presents a considerable area to the road thereby materially preventing sinking or miring. The flanges insure of effective traction and the corrugations of the flanges avoid skidding. Further it is not necessary to cut links to shorten or lengthen the chains as it is simply a matter of inserting or removing one or more of the links as before mentioned. Also the fingers engaging with the rim prevent undue rotation of the cross bars in respect to the tire.

What I claim as my invention is:—

The combination with a rim and tire mounted thereon, of side chains located at opposite sides of the tire and formed from a series of detachably connected flat links positioned substantially at right angles to the tire, means for tightening and fastening the ends of the chains, cross bars bent to span the tread side of the tire and having outstanding ends permanently riveted to selected links of the chains and stop fingers permanently secured to the side chains and opposing the rim and adapted by contact with the rim to arrest undue rotation of the bars in respect to the tire.

Signed at Prud'homme this 7th day of Feb., 1928.

KIRBY R. GARNER.